Aug. 11, 1936.  E. G. GRINHAM  2,050,945
FRAME FOR MOTOR VEHICLES
Filed Dec. 5, 1935  2 Sheets-Sheet 1
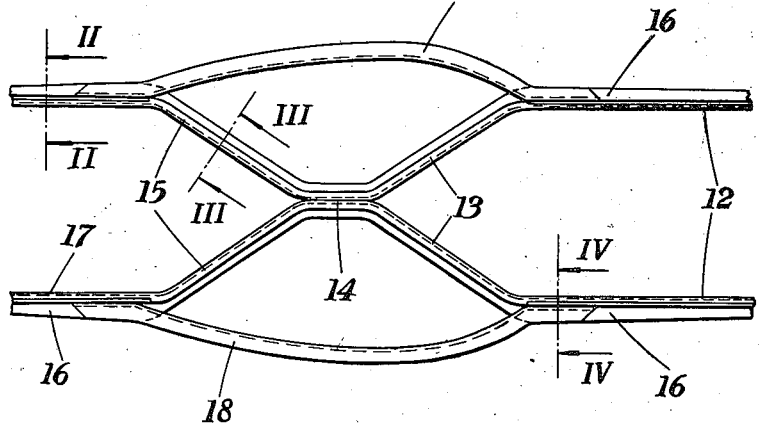
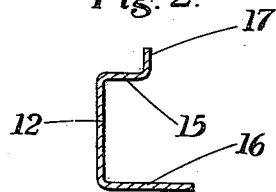 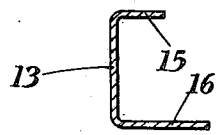
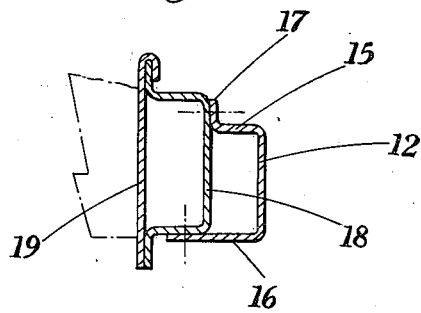
INVENTOR
Edward G. Grinham
BY
Mawhinney & Mawhinney
ATTORNEYS Aug. 11, 1936.  E. G. GRINHAM  2,050,945
FRAME FOR MOTOR VEHICLES
Filed Dec. 5, 1935  2 Sheets-Sheet 2
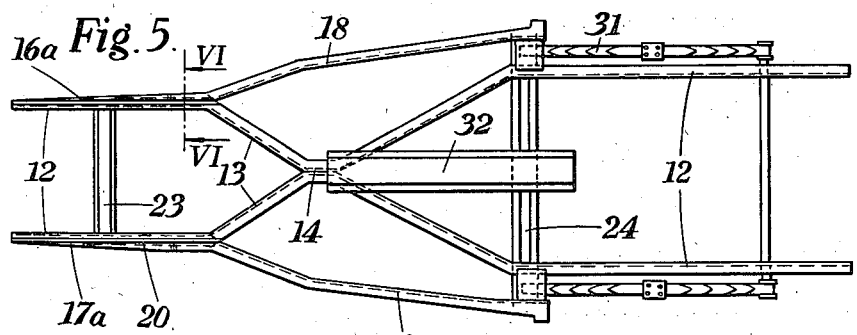
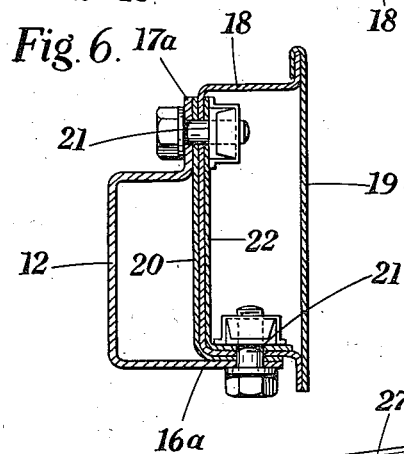
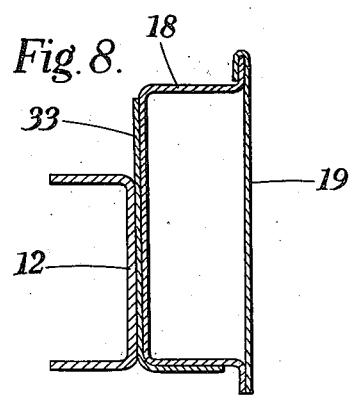
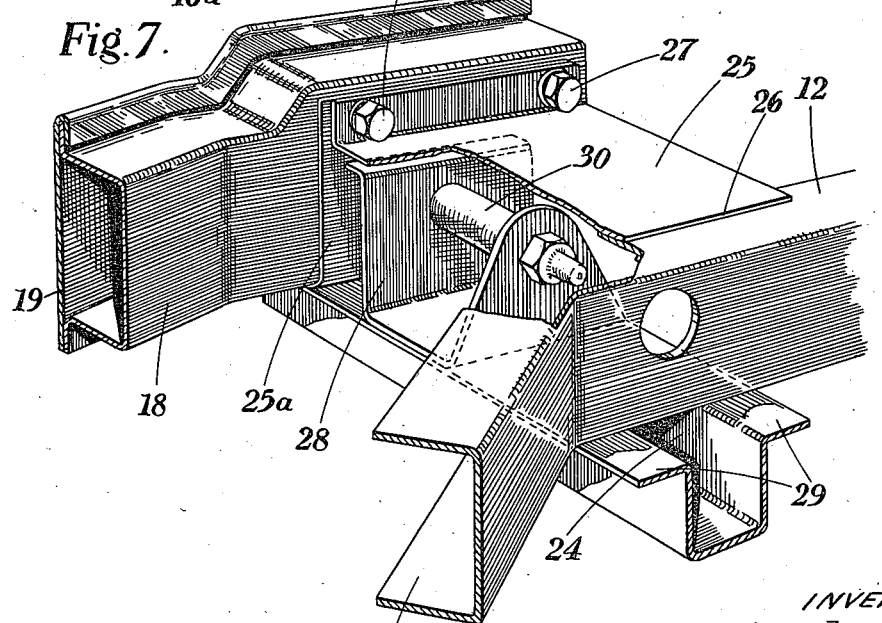
INVENTOR
Edward G. Grinham
BY
Mawhinney & Mawhinney
ATTORNEYS Patented Aug. 11, 1936

2,050,945

UNITED STATES PATENT OFFICE 2,050,945

FRAME FOR MOTOR VEHICLES

Edward George Grinham, Coventry, England, assignor of one-half to The Standard Motor Company Limited, Coventry, England Application December 5, 1935, Serial No. 53,088
In Great Britain May 18, 1935

8 Claims. (Cl. 280—106)

This invention relates to frames for motor-vehicles, and its main object is to provide a frame of robust construction which will be particularly light and on which bodies of different contour can be mounted in a very simple manner.

According to the invention, longitudinals, preferably of channel section, have parts inwardly-offset and secured to one another so as to form a frame which is substantially X-shaped between its ends, and other frame members such as body sills are attached to the longitudinals, directly or indirectly, so as to bridge the inwardly-disposed parts. Preferably the longitudinals are of channel-section and arranged with their channels facing outwardly, and parts of the lower horizontal flange of each are wider than the upper to provide for the support and attachment of the bridging frame members, the upper horizontal flanges being upwardly turned adjacent the ends of the bridging frame members to provide additional means for the attachment thereof.

According to a further feature of the invention, the body frame members are indirectly attached at one end to the longitudinals through a transverse member attached to both the longitudinals. Preferably the transverse member supports the ends of the body frame members in spaced relation from the adjacent longitudinals, and a support for a suspension spring may be mounted in the space between a longitudinal and the adjacent body frame member.

In the accompanying drawings:—

Figure 1 is a diagrammatic plan of a chassis frame with bridging body sills arranged according to the invention;

Figures 2, 3, and 4 are cross-sections, to a larger scale, on the lines II—II, III—III and IV—IV of Figure 1, respectively;

Figure 5 is a diagrammatic plan of an alternative arrangement of chassis frame with bridging body sills arranged according to the invention;

Figure 6 is a section, to a larger scale, on the line VI—VI of Figure 5;

Figure 7 is an enlarged fragmentary perspective view of part of Figure 5 showing the rear attachment of a body sill to the chassis frame; and Figure 8 is a cross section of a further alternative arrangement of chassis frame and body sill according to the invention.

In the construction illustrated in Figures 1–7, the actual chassis frame comprises two channel-section longitudinals 12, 12 intermediate parts of which are bent inwardly at 13 so that when placed back to back, with the channels facing outwardly, the two offset parts 13 constitute a more-or-less X-shaped member between the ends of the frame. Actually, the longitudinals adjacent the ends of the parts 13 for a material distance are more-or-less parallel to one another. The apices of the offset parts are flattened to contact at 14 with one another on the centre line of the vehicle, where they are preferably welded together, other securing means being provided if necessary.

In the arrangement of Figures 1–4 the upper horizontal flange 15 of each frame member 12 is somewhat narrower than the bottom flange 16 and this may be effected by turning upwardly the margin 17 of the top flange. This vertical portion of the top flange may be removed where necessary, for example, for the whole of the inwardly-disposed parts 13 of the frame, so that floorboards can lie on top of the upper horizontal flanges 15 without obstruction.

The vehicle body (or parts thereof, such as the door pillars) is attached, preferably in the known manner through bolts and caged nuts or by spot welding, to longitudinally-arranged metal sills 18 of channel-section and of a shape in plan approximating to the contour of the body. The ends of the sills are supported directly from and secured to the frame members 12 so that the sills bridge the inwardly-extending parts 13 thereof. Each end of a sill rests on the lower and wider flange 16 of the associated frame member to which it may be bolted or spot-welded, whilst the upper part of each end of the sill rests against and is bolted or spot-welded to the upstanding portion 17 of the horizontal top flange of the frame member. The body is also preferably additionally secured by bolting it to the rear substantially parallel parts of the frame members. The open sides of the sills may be boxed in by a plate, as shown at 19 in Figure 4.

In the modified arrangement of Figures 5–7, only the forward substantially parallel parts of the longitudinals 12 have their lower flanges 16a wider than the upper and their top flanges bent upwardly at 17a as it is only the front ends of the sills 18 in this case which are directly supported from the longitudinals. In practice the open sides of these front parallel parts are closed for substantially their whole length by an angle-strip 20 and the bottom and inner side of the sill engage this strip when bolted together at 21 as shown in Figure 6, a further strengthening angle-strip 22 being provided interiorly of the sill at this position. Preferably a channel-section transverse member 23 connects these front parallel parts of the longitudinals.

The rear ends of the sills are indirectly supported from the longitudinals by means of a transverse member 24 of channel-section attached to the underside of the longitudinals. Each end of the member 24 extends outwardly beyond the adjacent longitudinal and the rear end of each sill 18 rests on one of these projecing ends and is spaced from the adjacent longitudinal, as shown clearly in Figure 7. The upper part of this space is bridged by a plate 25 welded at 26 to the top of the longitudinal and bolted at 27 (preferably through an intermediate plate 25a) to the sill. In this space is a bracket 28 supported from the flanges 29 of the transverse member and provided with a pin 30 to receive the eye of a suspension spring, indicated at 31 in Figure 5. This arrangement therefore enables the springs to be relatively widely spaced.

In Figure 5 is shown a central longitudinal member 32 of inverted channel or similar section which is attached near its ends to the inwardly-disposed parts 13 of the longitudinals and the transverse member 24 and forms a tunnel for the propeller shaft (not shown).

In the alternative arrangement of Figure 8, the longitudinals 12, instead of being arranged with their channels facing outwardly, have them facing inwardly so that where the longitudinals are connected together, as at 14 in Figure 1, a tunnel is formed. Angle brackets 33 are attached, as by welding or bolting, to the outside of the channels at those places where the sills 18 have to be supported, the vertical flanges of the brackets preferably extending above the top of the longitudinals to provide for a secure fixing thereto of the sills.

By means of the invention a very light chassis frame can be provided and its rigidity is further increased by the body sill members 18 which bridge the inwardly-directed parts 13 of the longitudinals. Furthermore, the absence of the more usual (straight in plan view) longitudinal frame members enables the present chassis frame to be adapted very simply to suit different bodies as the inwardly-disposed parts 13 of the longitudinals do not interfere with the desired shaping of the body sills 18.

What I claim as my invention and desire to secure by Letters Patent of the United States is:—

1. In a motor-vehicle, a frame comprising a pair of longitudinals extending the whole length of the frame, said longitudinals having integral inwardly-offset parts which are secured to one another to form a frame having a substantially X-shaped portion, a transverse member secured to both said longitudinals in the vicinity of one end of said X-shaped portion, said transverse member extending beyond said longitudinals, and other frame members mounted on the extending portions of said transverse member, the other ends of said other frame members being directly secured to said longitudinals in the vicinity of the other end of said X-shaped portion, said other frame members being materially shorter than said longitudinals.

2. In a motor-vehicle, a frame comprising channel-section longitudinals extending the whole length of the frame, said longitudinals having integral parts inwardly offset between their ends and secured to one another with the channels facing outwardly to form a frame which is substantially X-shaped between its ends, and other frame members secured to said longitudinals to bridge said inwardly-offset parts, parts of the bottom flanges of said longitudinals being wider than the upper flanges thereof to provide supports for said bridging members.

3. In a motor-vehicle, a frame as specified in claim 1, and said transverse member being of inverted channel section.

4. In a motor-vehicle, a frame as specified in claim 1, and said transverse member extending beneath said longitudinals.

5. In a motor-vehicle, a frame as specified in claim 1, and a longitudinally-extending frame member connecting said transverse member with said inwardly-offset parts where they are united to one another.

6. In a motor-vehicle, a frame which is cross-braced between its ends, a pair of longitudinally-extending leaf springs outside the frame, the front ends of said springs being connected to pivots, said pivots being supported outside the frame on a transverse member secured to the frame, and other frame members outside said pivots and connecting the outer ends of said transverse member with the front portion of the frame.

7. In a motor-vehicle, a frame as specified in claim 6, and said other frame members constituting body sills.

8. In a motor-vehicle, a frame as specified in claim 6, and said other frame members bridging the part of the frame where the cross bracing is.

EDWARD GEORGE GRINHAM.